(12) United States Patent
Chiang

(10) Patent No.: US 7,443,664 B2
(45) Date of Patent: Oct. 28, 2008

(54) PORTABLE ELECTRONIC DEVICE INCORPORATING WEBCAM

(75) Inventor: Tsung-Wei Chiang, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 352 days.

(21) Appl. No.: 11/448,566

(22) Filed: Jun. 7, 2006

(65) Prior Publication Data

US 2007/0076365 A1    Apr. 5, 2007

(30) Foreign Application Priority Data

Sep. 30, 2005    (CN) .................... 2005 1 0100104

(51) Int. Cl.
*G06F 1/16*    (2006.01)

(52) U.S. Cl. .................. 361/683; 348/207.01; 439/579; 711/103

(58) Field of Classification Search ................ 345/173, 345/204; 381/715; 711/115, 103; 439/579, 439/600, 131; 348/131, 207.01, 372, E5.042; 455/418, 550.1; 361/679–687, 724–727
See application file for complete search history.

(56) References Cited

U.S. PATENT DOCUMENTS

| 7,271,977 | B1 * | 9/2007 | Melrose et al. | .......... 360/77.04 |
| 2005/0264986 | A1 * | 12/2005 | Kee et al. | .................... 361/681 |
| 2007/0273643 | A1 * | 11/2007 | Erez et al. | .................... 345/156 |

\* cited by examiner

*Primary Examiner*—Hung V Duong

(57) ABSTRACT

A portable electronic device (100) includes a device body (10) and a connector plug (30). The device body includes a digital camera (17). The connector plug has a mounting portion (31) and a plug portion (33). The mounting portion has one end rotatably connecting to the device body and electrically connecting to the digital camera, and an opposite end connecting with the plug portion. The plug portion is configured for electrically connecting with a computer thereby connecting the digital camera with a computer (200).

13 Claims, 5 Drawing Sheets

PORTABLE ELECTRONIC DEVICE INCORPORATING WEBCAM

TECHNICAL FIELD

The present invention relates to portable electronic devices, such as mobile phones, personal digital assistants (PDAs), and more specifically to portable electronic devices incorporating camera units.

BACKGROUND

With the development of the internet technologies, the use of tele-presence technology for chatting with friends or in meetings with business colleagues has become widespread. Tele-presence meetings generally take place between users in different locations who have computers connected to the internet, these sites maybe separated by great distances, thus it can be seen that tele-presence technology allows those who would not otherwise be able to meet to talk virtually face-to-face. However, to be able to use this technology the users must first each buy and install a separate webcam, thus increasing the complexity and the cost of using this technology.

Nowadays, many mobile phones are equipped with integral digital cameras, some of the mobile phones can be connected to the computer via a universal serial bus (USB) connection so that the digital cameras of the mobile phones can used as webcams, however the user still has to provide a separate USB cable.

Therefore, a new portable electronic device which can be used as a webcam for a computer is desired in order to overcome the above-described shortcomings.

SUMMARY OF THE INVENTION

In one embodiment thereof, a portable electronic device includes a device body and a connector plug. The device body includes a digital camera. The connector plug has a mounting portion and a plug portion. The mounting portion has one end rotatably connecting to the device body and electrically connecting to the digital camera, and an opposite end connecting with the plug portion. The plug portion is configured for electrically connecting with a computer thereby connecting the digital camera with the computer.

Other advantages and novel features will become more apparent from the following detailed description, when taken in conjunction with the accompanying drawings.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the present portable electronic device. Moreover, in the drawings, like reference numerals designate corresponding parts throughout the several views.

DETAILED DESCRIPTION OF THE EMBODIMENTS

Figure 1:
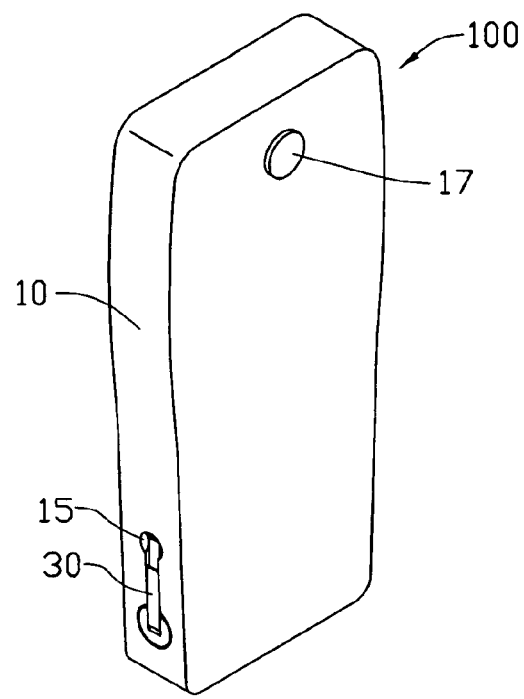
FIG. 1 is an isometric view of a portable electronic device, in accordance with a preferred embodiment.

Referring now to the drawings in detail, FIG. 1 shows a portable electronic device 100 such as a mobile phone. The portable electronic device 100 includes a device body 10 and a connector plug 30.

Figure 2:
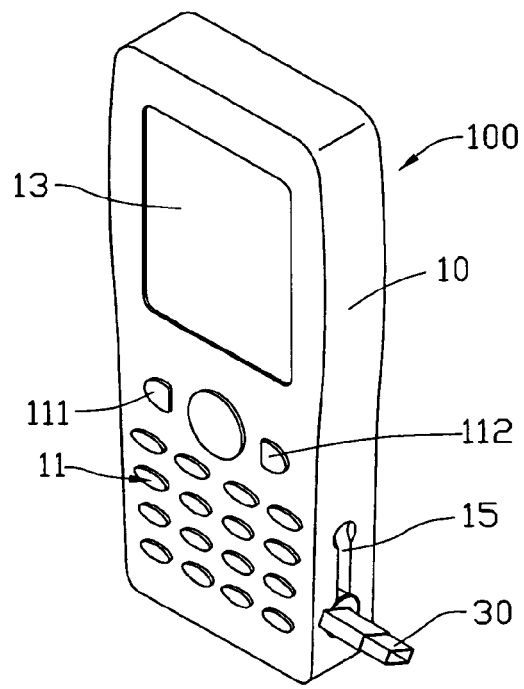
FIG. 2 is similar to FIG. 1, but viewed from another direction.
Figure 3:
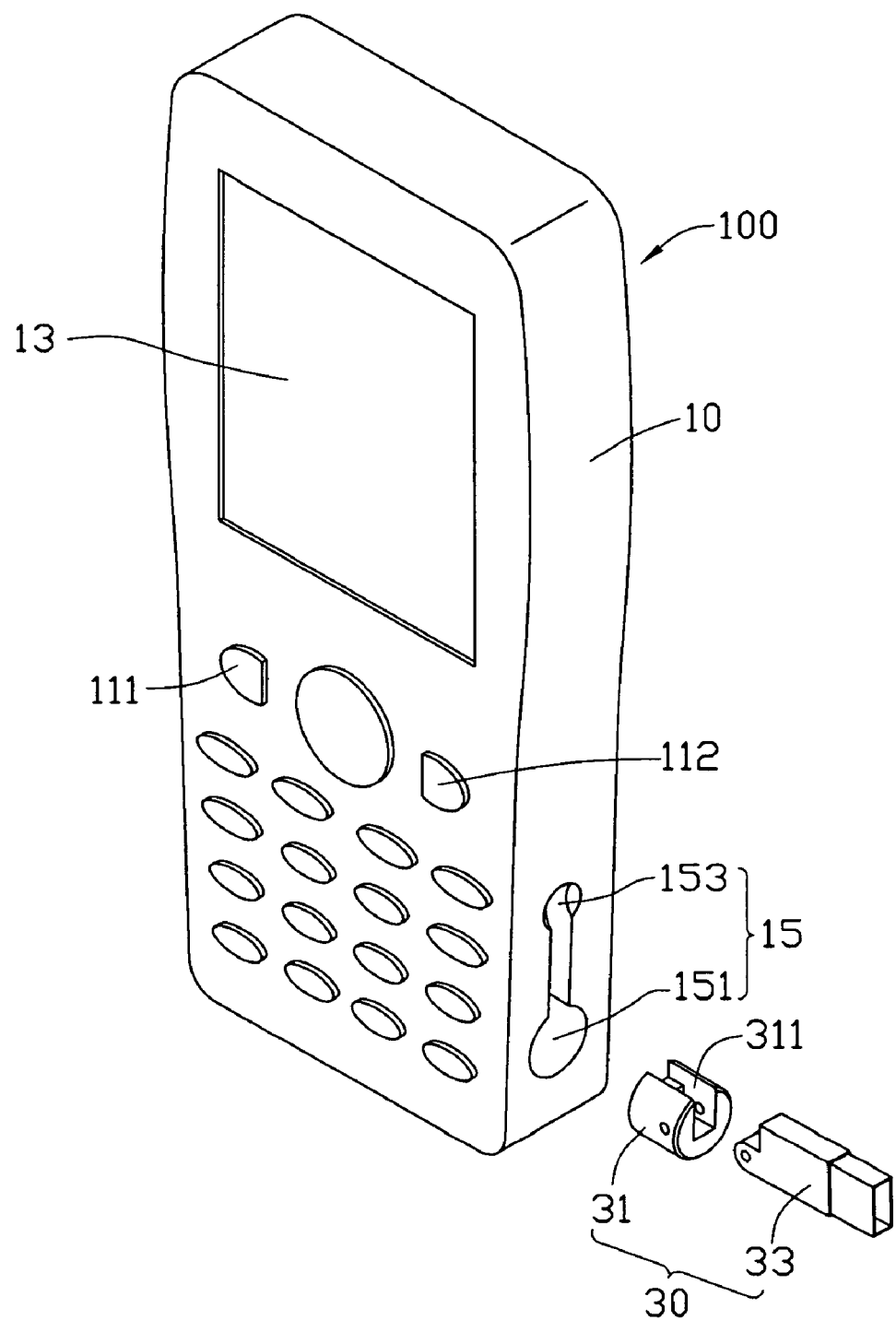
FIG. 3 is an exploded, isometric view of the portable electronic device shown in FIG. 1.

Referring together to FIGS. 2-3, the device body 10 includes a keypad 11, a display 13, and a digital camera 17 (see FIG. 1). The keypad 11 includes a switch key 111, and an operating key 112. The display 13 is provided in a front, upper portion of the device body 10, and the keypad 11 is provided in the device body 10 below the display 13. The digital camera 17 is provided in a back portion, above the device body 10. The body 1 has a sidewall (not labeled) defining a connecting groove 15. The connecting groove 15 has a round groove portion 151 and a rectangular groove portion 153 communicating with the round groove portion 151.

The connector plug 30 is rotatably received in the connecting groove 15. The connector plug 30 includes a mounting portion 31 and a plug portion 33. The plug portion 33 is preferrably a universal serial bus (USB) plug. The mounting portion 31 is rotatably configured in the round groove portion 151 of the connecting groove 15. The mounting portion 31 is rotatable about a first axis perpendicular to the sidewall, the plug portion 31 is rotatable about a second axis parallel to the sidewall. The mounting portion 31 defines a notch 311. One end of the plug portion 33 is hinged in the notch 311 so that the plug portion 33 is rotatable relative to the mounting portion 31. When the plug portion 33 is not in use, it can be rotated to a perpendicular position relative to the mounting portion 31, the plug portion 33 is received in the rectangular groove portion 153 of the connecting groove 15 for store, thus the plug portion 33 is protected by the rectangular groove portion 153 and a size of the portable electronic device 100 is also decreased.

Figure 4:
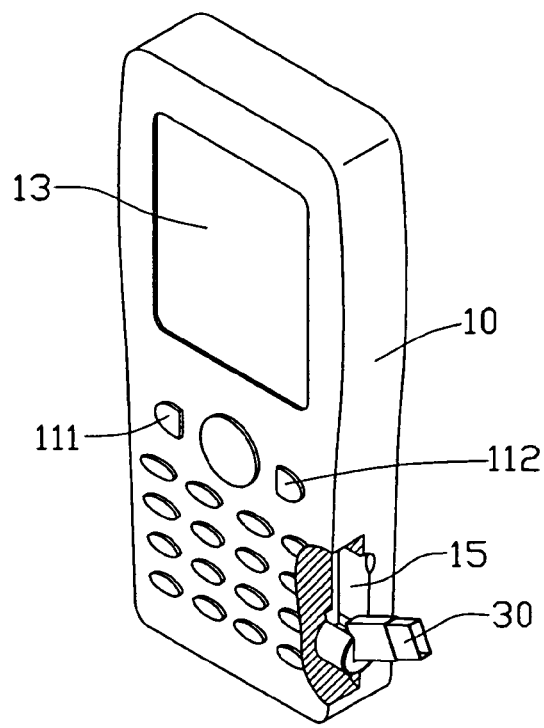
FIG. 4 is an assembled, isometric view of the portable electronic device shown in FIG. 3, but with a plug of the portable electronic device partly opened.
Figure 5:
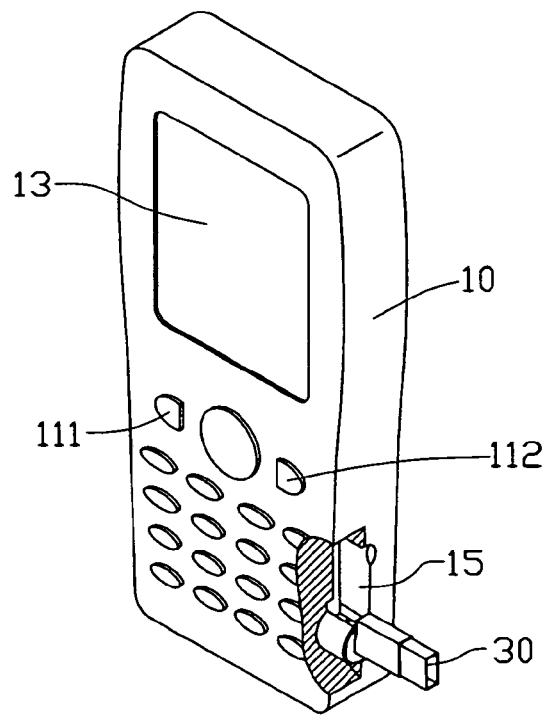
FIG. 5 is similar to FIG. 4, but with the plug fully opened.
Figure 6:
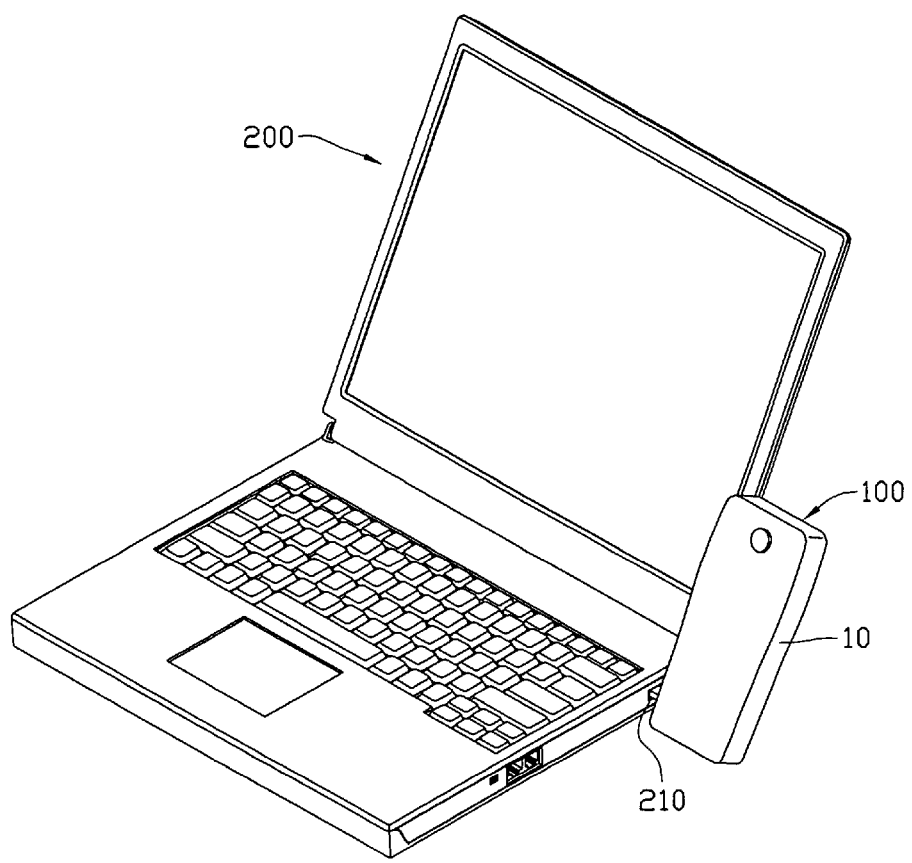
FIG. 6 is similar to FIG. 5, but with the plug connected to a computer.

Referring together to FIGS. 4-6, the portable electronic device 100 can be connected with a computer 200. The computer 200 has a connecting port 210 such as a USB port for engaging with the plug portion 33 of the portable electronic device 100. In use, the plug portion 33 is pulled from the rectangular groove portion 153 and then is inserted into the connecting port 210 of the computer 200. Then, the plug portion 33 is electrically connecting with the computer 200 thereby connecting the digital camera 17 with the computer 200. Because the mounting portion 31 of the connector plug 30 is rotatable, the position of the portable electronic device 100 can be adjusted by rotating the mounting portion 31 so that the digital camera 17 of the portable electronic device 100 faces a required user or object.

As described above, the portable electronic device 100 can be used as a webcam for visible chats or meetings instead of using a separate webcam. Because the connector plug 30 has the plug portion 33 for connecting with the computer 200, the user does not need to carry an extra USB cable. In this way tele-prescence meetings are made both more affordable and more convenient. In addition, the connector plug 30 is rotatable out of the connecting groove 15 for connecting the digital camera 17 with the computer 200 and is rotatable into the connecting groove 15 for store, thus a size of the portable electronic device 100 is also decreased.

Figures 7, 8:
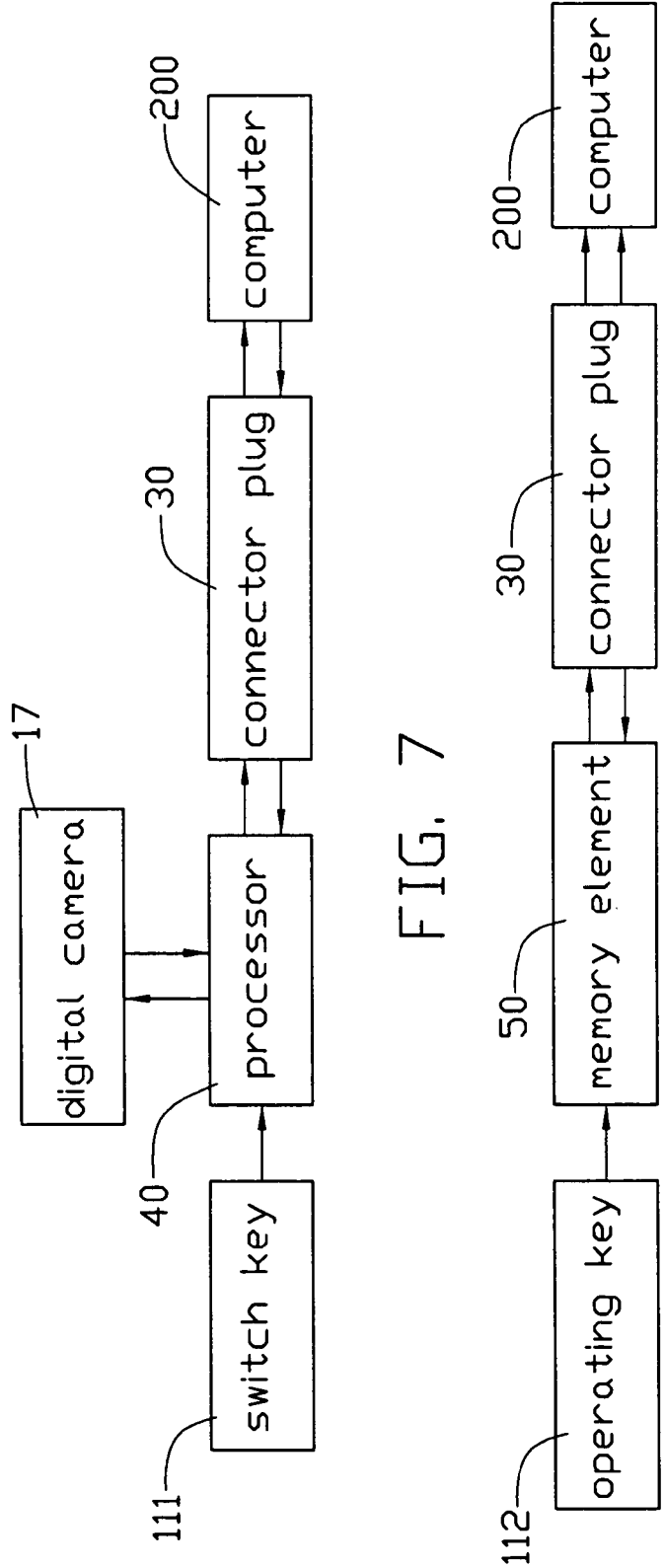
FIG. 7 is a controlling chart, showing a processor connecting to the computer.
FIG. 8 is another controlling chart, showing a memory element connecting to the computer.

In an alternative embodiment, referring to FIG. 7, a processor 40 connecting to the switch key 111 is configured in the portable electronic device 100. The processor 40 is used for controlling a webcam function of the digital camera 17. After the portable electronic device 100 is connected with the computer 200 via the connector plug 30, the switch key is pressed for starting the webcam function of the digital camera 17, allowing the digital camera 17 of the portable electronic device 100 to function as a webcam.

In other alternative embodiments, referring to FIG. 8, a memory element 50 connecting to the operating key 51 is configured in the portable electronic device 100. The memory element is used for storing a password and user identification (ID) for the computer 200. If the portable electronic device 100 is connected with the computer 200, the operating key is pressed for inputting the password and the identification (ID) for the computer 200. By using such portable electronic device 100, the user does not need to remember his/her password and/or user identification (ID) of the computer 200. Therefore, the user can set a more complex password and user identification (ID) for the computer 200 for high security. The connector plug 30 might also be used for charging the portable electronic device 100 when connected with the computer 200. The portable electronic device 100 might also be used as a microphone/speaker unit.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device, comprising:
    a device body including a digital camera; and
    a connector plug having a mounting portion and a plug portion, the mounting portion having one end rotatably connecting to the device body and electrically connecting to the digital camera, and an opposite end connecting with the plug portion, the plug portion being configured for electrically connecting with a computer thereby connecting the digital camera with the computer.

2. The portable electronic device as claimed in claim 1, wherein the digital camera is provided in a back portion, above the device body.

3. The portable electronic device as claimed in claim 1, wherein the device body includes a sidewall defining a groove therein, and the connector plug is rotatably received in the groove.

4. The portable electronic device as claimed in claim 3, wherein the groove has a round groove portion and a rectangular groove portion communicating with the round groove portion, and the mounting portion is rotatably mounted in the round groove portion.

5. The portable electronic device as claimed in claim 4, wherein the plug is a universal serial bus plug.

6. The portable electronic device as claimed in claim 4, wherein the mounting portion defines a notch for hinging the plug portion.

7. The portable electronic device as claimed in claim 1, wherein a processor for controlling a webcam function of the digital camera is configured in the portable electronic device.

8. The portable electronic device as claimed in claim 7, wherein a switch key is provided on the portable electronic device for starting the webcam function of the digital camera.

9. The portable electronic device as claimed in claim 1, wherein a memory element for storing a user password and a user identification (ID) for the computer is configured in the portable electronic device.

10. The portable electronic device as claimed in claim 9, wherein an operating key connecting with memory element is provided on the portable electronic device for controlling the memory element to input the password and the identification for the computer.

11. The portable electronic device as claimed in claim 1, wherein a display is provided in a front, upper portion of the device body, and a keypad is provided in the device body below the display.

12. A portable electronic device comprising:
    a device body including an embedded digital camera, and a sidewall with a connecting groove formed therein;
    a connector plug rotatably mounted in the connecting groove and electrically connected with the digital camera, wherein the connector plug is rotatable out of the connecting groove for connecting the digital camera with a computer, and is rotatable into the groove for store.

13. The portable electric device of claim 12, wherein the connector plug includes a mounting portion mounted in the groove and a plug portion connected with the mounting portion, the mounting portion being rotatable about a first axis perpendicular to the sidewall, the plug portion being rotatable about a second axis parallel to the sidewall.

* * * * *